United States Patent
Kawashima

(10) Patent No.: US 7,667,941 B2
(45) Date of Patent: Feb. 23, 2010

(54) POWER SUPPLY CIRCUIT PROTECTING METHOD AND APPARATUS FOR THE SAME

(75) Inventor: Reiji Kawashima, Shiga (JP)

(73) Assignee: Daikin Industries, Ltd., Osaka-shi (JP)

( * ) Notice: Subject to any disclaimer, the term of this patent is extended or adjusted under 35 U.S.C. 154(b) by 287 days.

(21) Appl. No.: 11/664,494

(22) PCT Filed: Sep. 30, 2005

(86) PCT No.: PCT/JP2005/018086

§ 371 (c)(1),
(2), (4) Date: Jul. 12, 2007

(87) PCT Pub. No.: WO2006/038544

PCT Pub. Date: Apr. 13, 2006

(65) Prior Publication Data

US 2008/0130183 A1 Jun. 5, 2008

(30) Foreign Application Priority Data

Oct. 4, 2004 (JP) ............................. 2004-291315

(51) Int. Cl.
H02H 3/08 (2006.01)

(52) U.S. Cl. ...................... 361/93.1; 361/79; 361/93.5; 361/93.6; 361/93.7

(58) Field of Classification Search .................. 361/30, 361/79, 93.1, 93.5, 93.6, 93.7
See application file for complete search history.

(56) References Cited

U.S. PATENT DOCUMENTS

| | | | | |
|---|---|---|---|---|
| 4,719,555 A | * | 1/1988 | Hattori et al. | 363/56.05 |
| 5,705,904 A | * | 1/1998 | Kuriyama | 318/400.21 |
| 6,244,061 B1 | * | 6/2001 | Takagi et al. | 62/229 |
| 6,826,062 B2 | * | 11/2004 | Shinba | 363/40 |
| 7,221,121 B2 | * | 5/2007 | Skaug et al. | 318/807 |

FOREIGN PATENT DOCUMENTS

| JP | 02-302809 | * | 5/1989 |
|---|---|---|---|
| JP | 07-184316 | * | 12/1993 |
| JP | 09-009487 | * | 6/1995 |
| JP | 7-184316 A | | 7/1995 |
| JP | 9-163752 A | | 6/1997 |
| JP | 2003-16948 A | | 1/2003 |

* cited by examiner

*Primary Examiner*—Stephen W Jackson
*Assistant Examiner*—Terrence R Willoughby
(74) *Attorney, Agent, or Firm*—Birch, Stewart, Kolasch & Birch, LLP

(57) ABSTRACT

This invention relates to a power supply circuit protecting method and a power supply circuit protecting apparatus. The apparatus is provided with a power supply circuit for converting a voltage from a three-phase alternating current inputting power supply into a predetermined voltage, and an output operation circuit for performing a predetermined operation by adopting an output voltage from the power supply circuit as input. In the apparatus, based on a current value on the input side or the output side of the power supply circuit, abnormality of the supply voltage is judged, and when there is an abnormality, the output operation circuit is controlled.

30 Claims, 8 Drawing Sheets

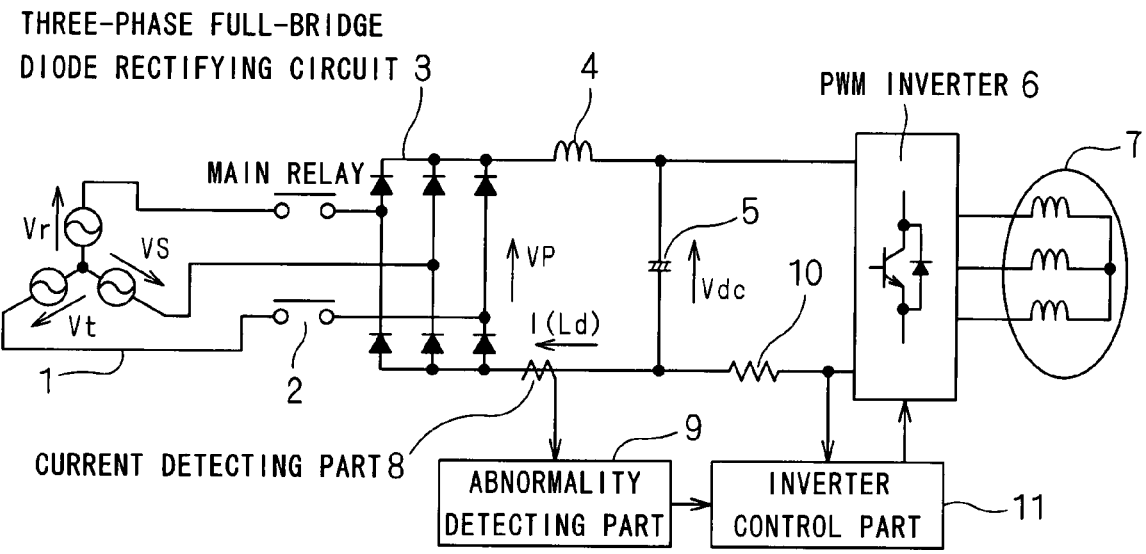

F I G. 8
(A)
(B)
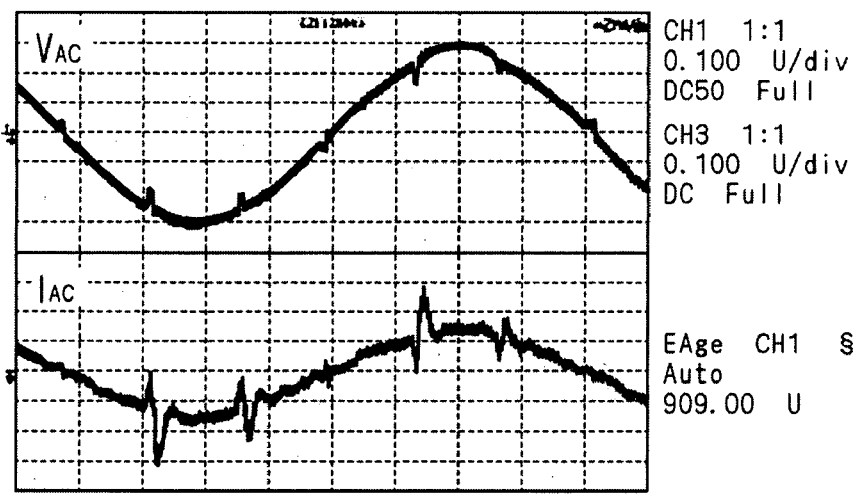

POWER SUPPLY CIRCUIT PROTECTING METHOD AND APPARATUS FOR THE SAME

TECHNICAL FIELD

This invention relates to a power supply circuit protecting method in an apparatus including a power supply circuit for converting an ac input voltage into a predetermined output voltage and an output operation circuit for performing a predetermined operation by adopting the output voltage as input, and an apparatus for the same.

BACKGROUND ART

In an apparatus including a power supply circuit for converting an ac input voltage into a predetermined output voltage and an output operation circuit for performing a predetermined operation by adopting the output voltage as input, stresses greater than at normal times are imposed on circuit components such as IGBT, capacitor, reactor or the like in the case where a voltage abnormality such as voltage distortion, three-phase unbalance, instantaneous voltage drop, instantaneous interruption of service or the like occurs in a voltage supplied to the power supply circuit, or in the case where an improper voltage is applied due to improper wiring, which may cause problems such as damage to components, or the like.

Accordingly, circuit components of a power supply circuit have conventionally been protected by detecting abnormalities of a current flowing in semiconductor switching devices such as IGBT, transistor or the like as an instantaneous overcurrent when it exceeds a certain threshold and a dc voltage as an overvoltage when it exceeds a certain threshold, respectively, and in response to this detection, stopping a switching operation of the power supply circuit or turning off a main relay.

Further, there has been presented actively detecting a power-supply voltage abnormality by providing means for detecting supply voltage waveforms, and stopping a driving power or making an appropriate correction at the occurrence of abnormality, to thereby allow a protecting operation and prevent the occurrence of component damage or abnormal sound (cf. Patent document 1).

Patent document 1: Japanese Patent Application Laid-Open No. 2003-169481

DISCLOSURE OF THE INVENTION

Problems to be Solved by the Invention

Since problems arise in that component damage is invited or abnormal sound occurs when there is some abnormality in a voltage supplied to the power supply circuit, the abnormality in the supply voltage needs to be detected to perform a protecting operation, however, conventional overcurrent detecting method and overvoltage detecting method cannot detect abnormal sound when it occurs due to a supply voltage abnormality while allowing component damage to be avoided, so that the occurrence of abnormal sound cannot be prevented.

And, in the system of detecting a voltage abnormality based on supply voltage waveforms, as shown in Patent document 1, there are supply voltage abnormalities difficult to detect, and further, it may be judged as a supply voltage abnormality even in a condition where no influence is exerted upon components.

Further, a dedicated circuit for detecting a supply voltage abnormality needs to be newly added in other most power supply circuits, except the case in which supply voltage waveforms are detected for performing current control as in a single-phase PWM rectifying circuit, which results in an increase in cost.

This invention has been made in view of the above-described problems, and has an object to provide a power supply circuit protecting method and an apparatus for the same capable of easily and reliably detecting the presence or absence of a supply voltage abnormality, and performing control necessary for protecting components of the power supply circuit.

Means for Solving the Problems

A power supply circuit protecting method according to claim 1 is a method, in an apparatus including a power supply circuit for converting an ac input voltage into a predetermined output voltage and an output operation circuit for performing a predetermined operation by adopting the output voltage as input, comprising: detecting a current value of the power supply circuit; judging the presence or absence of abnormality in a supply voltage to the power supply circuit based on a detected current value; and controlling at least the output operation circuit so as to deal with a supply voltage abnormality in response to a judgment that the supply voltage abnormality is present.

A power supply circuit protecting apparatus according to claim 2 including a power supply circuit for converting an ac input voltage into a predetermined output voltage and an output operation circuit for performing a predetermined operation by adopting the output voltage as input comprises: current detecting means for detecting a current value of the power supply circuit; judging means for judging the presence or absence of abnormality in a supply voltage to the power supply circuit based on a detected current value; and controlling means for controlling at least the output operation circuit so as to deal with a supply voltage abnormality in response to a judgment that the supply voltage abnormality is present.

A power supply circuit protecting apparatus according to claim 3 employs, as said current detecting means, one that detects the current value on an input side of the power supply circuit.

A power supply circuit protecting apparatus according to claim 4 employs, as said current detecting means, one that detects the current value on an output side of the power supply circuit.

A power supply circuit protecting apparatus according to claim 5 employs, as said judging means, one that judges the presence or absence of a power supply unbalance as the presence or absence of the supply voltage abnormality.

A power supply circuit protecting apparatus according to claim 6 employs, as said judging means, one that judges the presence or absence of a supply voltage distortion as the presence or absence of the supply voltage abnormality.

A power supply circuit protecting apparatus according to claim 7 employs, as said judging means, one that judges the presence or absence of a power-supply open phase as the presence or absence of the supply voltage abnormality.

A power supply circuit protecting apparatus according to claim 8 employs, as said judging means, one that judges the presence or absence of an instantaneous voltage drop as the presence or absence of the supply voltage abnormality.

A power supply circuit protecting apparatus according to claim 9 employs, as said judging means, one that judges the presence or absence of an instantaneous interruption of service as the presence or absence of the supply voltage abnormality.

A power supply circuit protecting apparatus according to claim 10 employs, as said controlling means, one that stops the output operation circuit in response to a judgment made by the judging means that the supply voltage abnormality is present.

A power supply circuit protecting apparatus according to claim 11 employs, as said controlling means, one that stops the power supply circuit in response to a judgment made by the judging means that the supply voltage abnormality is present.

A power supply circuit protecting apparatus according to claim 12 employs, as said judging means, one that judges the presence or absence of a supply voltage abnormality at a first level that requires the output operation circuit to be stopped and the presence or absence of a supply voltage abnormality at a second level lower than the first level, and employs, as said controlling means, one that stops the output operation circuit in response to the supply voltage abnormality at the first level, and changes operating conditions of the output operation circuit in response to the supply voltage abnormality at the second level.

A power supply circuit protecting apparatus according to claim 13 employs, as said judging means, one that judges the presence or absence of a supply voltage abnormality at a first level that requires the output operation circuit to be stopped and the presence or absence of a supply voltage abnormality at a second level lower than the first level, and employs, as said controlling means, one that stops the power supply circuit in response to the supply voltage abnormality at the first level, and changes operating conditions of the output operation circuit in response to the supply voltage abnormality at the second level.

The power supply circuit protecting method and such apparatus of this invention, in an apparatus including a power supply circuit for converting an ac input voltage into a predetermined output voltage and an output operation circuit for performing a predetermined operation by adopting the output voltage as input, detect a current value of the power supply circuit, judge the presence or absence of abnormality in a supply voltage to the power supply circuit based on a detected current value, and control at least the output operation circuit so as to deal with a supply voltage abnormality in response to a judgment that the supply voltage abnormality is present. This allows detection of supply voltage abnormalities which could not have been detected with voltage waveforms, and further, improved accuracy in detection of a supply voltage abnormality, and furthermore, reliable protection of components of the power supply circuit.

Effects of the Invention

The power supply circuit protecting method of this invention achieves distinctive effects that allow detection of a wide range of supply voltage abnormalities including supply voltage abnormalities which could not have been detected with voltage waveforms, and further, improved accuracy in detection of a supply voltage abnormality, and furthermore, reliable protection of components of the power supply circuit.

The power supply circuit protecting apparatus of this invention achieves distinctive effects that allow detection of a wide range of supply voltage abnormalities including supply voltage abnormalities which could not have been detected with voltage waveforms, and further, improved accuracy in detection of a supply voltage abnormality, and furthermore, reliable protection of components of the power supply circuit.

BEST MODE FOR CARRYING OUT THE INVENTION

Hereinafter, an embodiment of a power supply circuit protecting method and an apparatus for the same according to this invention will be described in detail with reference to the accompanying drawings.

FIG. 1 is a schematic diagram showing the configuration of a motor driving system into which an embodiment of this invention is incorporated.

This motor driving system includes a three-phase full-bridge diode rectifying circuit 3 having its input terminal connected to a three-phase ac power supply 1 via a main relay 2, a capacitor 5 connected between output terminals of the three-phase full-bridge diode rectifying circuit 3 via a reactor 4, a PWM (pulse width modulation) inverter 6 adopting a voltage between terminals of the capacitor 5 as input, a motor 7 to which an output of the PWM inverter 6 is supplied, a current detecting part 8 constituted of a current transformer provided between an output terminal of the three-phase full-bridge diode rectifying circuit 3 and a corresponding one of the terminals of the capacitor 5, or the like, an abnormality detecting part 9 for performing abnormality detection by adopting a detected current value as input, thereby outputting an abnormality detection signal, a resistor 10 connected between a terminal of the capacitor 5 and a corresponding input terminal of the PWM inverter 6, and an inverter control part 11 for controlling each switching device of the PWM inverter 6 by adopting, as input, an inverter input voltage obtained between the resistor 10 and the input terminal of the PWM inverter 6, and further, controlling each switching device of the PWM inverter 6 by adopting the abnormality detection signal as input so as to deal with a supply voltage abnormality of the three-phase full-bridge diode rectifying circuit 3.

The aforementioned abnormality detecting part 9 is to detect a three-phase unbalance based on the difference between the maximum value and minimum value of dc current. However, detection of a supply voltage distortion may also be achieved based on the peak value of the detected current value, the difference between the detected current value and a reference sinusoidal waveform (current command-value), the fact that the amount of change in current within a certain period of time is greater than a normal amount of change, or the like. And, detection of a power supply open phase may also be achieved based on the difference between the maximum value and minimum value of dc current. Further, detection of an instantaneous voltage drop may also be achieved by computing a root-mean-square current value. Furthermore, detection of an instantaneous interruption of service may also be achieved based on that dc current does not flow.

And, the aforementioned abnormality detecting part 9 further has the control function of, previously setting a power-supply voltage abnormality detection level, and in response to that a detected current value exceeds the power-supply voltage abnormality detection level, outputting an abnormality detection signal indicative of stopping of the operation of the PWM inverter 6 so as to prevent the occurrence of component damage or abnormal sound. However, it may further have the control function of, previously setting a first power-supply voltage abnormality detection level for stopping the operation of the PWM inverter 6 and a second level lower than that, and in the case where the detected current value is not less than the second level and under the first power-supply voltage abnormality detection level, outputting an abnormality detection signal indicative of reduction of the output frequency and duty of the PWM inverter 6 to reduce an output power so as to prevent the occurrence of component damage or abnormal sound. And, it may further have the control function of, previously setting a first power-supply voltage abnormality detection level for stopping the operation of the inverter circuit and a second level lower than that, and outputting an abnormality detection signal indicative of stopping of the inverter when a period during which the detected current value exceeds the second level continues for a certain period of time, even under the first power-supply voltage abnormality detection level.

Since the processing in the inverter control part 11 during normal operation is conventionally known, detailed description will be omitted.

With the motor driving system shown in FIG. 1, various power-supply voltage abnormalities can be detected by detecting a current on the output side (dc side) of the three-phase full-bridge diode rectifying circuit 3, and in response to this detection, the PWM inverter 6 can be controlled so as to prevent the occurrence of damage to components of the three-phase full-bridge diode rectifying circuit 3 or abnormal sound.

FIG. 2 is a schematic diagram showing the configuration of a motor driving system into which another embodiment of this invention is incorporated.

This motor driving system includes a single-phase full-bridge diode rectifying circuit 23 having its input terminal connected to a single-phase ac power supply 21 via a main relay 22, a transistor 25 connected between output terminals of the single-phase full-bridge diode rectifying circuit 23 via a reactor 24, a capacitor 33 connected between collector and emitter terminals of the transistor 25 via a diode 32, a PWM (pulse width modulation) inverter 26 adopting a voltage across terminals of the capacitor 33 as input, a motor 27 to which an output of the PWM inverter 26 is supplied, a resistor (current detecting part) 28 for current detection connected between one of the output terminals of the single-phase full-bridge diode rectifying circuit 23 and a corresponding terminal of the transistor 25, an abnormality detecting part 29 for performing abnormality detection by adopting a detected current value as input, thereby outputting an abnormality detection signal, a resistor 30 connected between one of the terminals of the capacitor 33 and a corresponding input terminal of the PWM inverter 26, an inverter control part 31 for controlling each switching device of the PWM inverter 26 by adopting, as input, an inverter input voltage obtained between the resistor 30 and the input terminal of the PWM inverter 26, and further, controlling each switching device of the PWM inverter 26 by adopting the abnormality detection signal as input so as to deal with a supply voltage abnormality of the single-phase full-bridge diode rectifying circuit 23, and a converter control part 34 for controlling the transistor 25 by adopting the detected current value as input, and further, where applicable (in the case where connection indicated by broken line in FIG. 2 exists), controlling the transistor 25 by adopting the abnormality detection signal as input so as to deal with the supply voltage abnormality of the single-phase full-bridge diode rectifying circuit 23.

The single-phase full-bridge diode rectifying circuit 23, reactor 24 and transistor 25 constitute a PWM rectifying circuit.

The aforementioned abnormality detecting part 29 is to detect a power-supply voltage based on the peak value of the detected current value, the difference between the detected current value and a reference sinusoidal waveform (current command value), the fact that the amount of change in current within a certain period of time is greater than a normal amount of change, or the like. However, detection of an instantaneous voltage drop may also be achieved by computing a root-mean-square current value. Further, detection of an instantaneous interruption of service may also be achieved based on that dc current does not flow.

The aforementioned abnormality detecting part 29 further has the control function of, previously setting a power-supply voltage abnormality detection level, and in response to that a detected current value exceeds the power-supply voltage abnormality detection level, outputting an abnormality detection signal indicative of stopping of the operation of the PWM inverter 26 so as to prevent the occurrence of component damage or abnormal sound. However, it may further have the control function of, previously setting a first power-supply voltage abnormality detection level for stopping the operation of the PWM inverter 26 and a second level lower than that, and in the case where the detected current value is not less than the second level and under the first power-supply voltage abnormality detection level, outputting an abnormality detection signal indicative of reduction of the output frequency and duty of the PWM inverter 26 to reduce an output power so as to prevent the occurrence of component damage or abnormal sound. And, it may further have the control function of, previously setting a first power-supply voltage abnormality detection level for stopping the operation of the inverter circuit and a second level lower than that, and outputting an abnormality detection signal indicative of stopping of the inverter when a period during which the detected current value exceeds the second level continues for a certain period of time, even under the first power-supply voltage abnormality detection level. Further, it may have the function of, setting a first power-supply voltage abnormality detection level for stopping the PWM operation and a second level lower than that, and in the case where a detected current value is not less than the second level and under the first level, outputting an abnormality detection signal indicative of stopping of the switching operation of the PWM rectifying circuit in that carrier period so as to prevent the occurrence of component damage or abnormal sound.

Of course, the abnormality detection signal from the abnormality detecting part 29 is supplied to a corresponding one of the inverter control part 31 and converter control part 34 in accordance with the type of the abnormality detection signal.

Since the processing in the inverter control part 31 and the processing in the converter control part 34 during normal operation have conventionally been known, detailed description will be omitted.

With the motor driving system shown in FIG. 2, various power-supply voltage abnormalities can be detected by detecting a current on the output side (dc side) of the single-phase full-bridge diode rectifying circuit 23, and in response to this detection, the PWM inverter 26 and/or the PWM rectifying circuit can be controlled so as to prevent the occurrence of damage to components of the single-phase full-bridge diode rectifying circuit 23 or abnormal sound.

FIG. 3 is a schematic diagram showing the configuration of a motor driving system into which another embodiment of this invention is incorporated.

This motor driving system includes a PWM rectifying circuit 43 having its input terminal connected to a three-phase ac power supply 41 via a main relay 42a and a reactor 42b, a capacitor 45 connected between output terminals of the PWM rectifying circuit 43, a PWM inverter 46 adopting a voltage between terminals of the capacitor 45 as input, a motor 47 to which an output of the PWM inverter 46 is supplied, a current detecting resistor 48 connected between one of the output terminals of the PWM rectifying circuit 43 and a corresponding one of the terminals of the capacitor 45, an abnormality detecting part 49 for performing abnormality detection by adopting a detected current value as input, thereby outputting an abnormality detection signal, a resistor 50 connected between one of the terminals of the capacitor 45 and a corresponding input terminal of the PWM inverter 46, an inverter control part 51 for controlling each switching device of the PWM inverter 46 by adopting, as input, an inverter input voltage obtained between the resistor 50 and the input terminal of the PWM inverter 46, and further, controlling each switching device of the PWM inverter 46 by adopting the abnormality detection signal as input so as to deal with a supply voltage abnormality of the PWM rectifying circuit 43, and a converter control part 52 for controlling switching devices of the PWM rectifying circuit 43 by adopting, as input, a current detected using the current detecting resistor 48, and further, where applicable (in the case where connection indicated by broken line in FIG. 3 exists), controlling the switching devices of the PWM rectifying circuit 43 by adopting the abnormality detection signal as input so as to deal with a supply voltage abnormality of the PWM rectifying circuit 43.

The aforementioned abnormality detecting part 49 is to detect a three-phase unbalance based on the difference between the maximum value and minimum value of dc current. However, detection of a power-supply voltage distortion may also be achieved based on the peak value of a detected current value, the difference between the detected current value and a reference sinusoidal waveform (current command value), the fact that the amount of change in current within a certain period of time is greater than a normal amount of change, or the like. And, detection of a power supply open phase may also be achieved based on the difference between the maximum value and minimum value of dc current. Further, detection of an instantaneous voltage drop may also be achieved by computing a root-mean-square current value. Furthermore, detection of an instantaneous interruption of service may also be achieved based on that dc current does not flow.

And, the aforementioned abnormality detecting part 49 further has the control function of, previously setting a power-supply voltage abnormality detection level, and in response to that the detected current value exceeds the power-supply voltage abnormality detection level, outputting an abnormality detection signal indicative of stopping of the operation of the PWM inverter 46 so as to prevent the occurrence of component damage or abnormal sound. However, it may further have the control function of, previously setting a first power-supply voltage abnormality detection level for stopping the operation of the PWM inverter 46 and a second level lower than that, and in the case where the detected current value is not less than the second level and under the first power-supply voltage abnormality detection level, outputting an abnormality detection signal indicative of reduction of the output frequency and duty of the PWM inverter 46 to reduce an output power so as to prevent the occurrence of component damage or abnormal sound. And, it may further have the control function of, previously setting a first power-supply voltage abnormality detection level for stopping the operation of the inverter circuit and a second level lower than that, and outputting an abnormality detection signal indicative of stopping of the inverter when a period during which the detected current value exceeds the second level continues for a certain period of time, even under the first power-supply voltage abnormality detection level. Further, it may have the function of, setting a first power-supply voltage abnormality detection level for stopping the PWM operation and a second level lower than that, and in the case where a detected current value is not less than the second level and under the first level, outputting an abnormality detection signal indicative of stopping of the switching operation of the PWM rectifying circuit in that carrier period so as to prevent the occurrence of component damage or abnormal sound.

Of course, the abnormality detection signal from the abnormality detecting part 49 is supplied to a corresponding one of the inverter control part 51 and converter control part 52 in accordance with the type of abnormality detection signal.

Since the processing in the inverter control part 51 and the processing in the converter control part 52 during normal operation have conventionally been known, detailed description will be omitted.

With the motor driving system shown in FIG. 3, various power-supply voltage abnormalities can be detected by detecting a current on the output side (dc side) of the PWM rectifying circuit 43, and in response to this detection, the PWM inverter 46 and/or the PWM rectifying circuit 43 can be controlled so as to prevent the occurrence of damage to components of the PWM rectifying circuit 43 or abnormal sound.

FIG. 4 is a schematic diagram showing the configuration of a motor driving system into which another embodiment of this invention is incorporated.

The differences of this motor driving system from the motor driving system shown in FIG. 3 lie only in that a current detecting part 53 such as a current transformer is provided on the input side of the PWM rectifying circuit 43 while omitting the current detecting resistor 48 and that the abnormality detecting part 49 adopting a current detected by the current detecting part 53 as input, instead of a current detected by the current detecting resistor 48 as input, is employed. The current detecting part 53 may be anything that detects currents for three phases, but may be anything that only detects currents for two phases. In the latter case, the rest of current for one phase can be detected by computation in a required processing part.

The abnormality detecting part 49 in this embodiment is to detect a three-phase unbalance by computing a root-mean-square current value of each of three-phase currents to obtain an unbalance factor of each phase current. However, detection of a power-supply open phase may be achieved by detecting the presence of phase in which current does not flow. And, detection of an instantaneous voltage drop may also be achieved by computing a root-mean-square current value. Further, detection of an instantaneous interruption of service may also be achieved based on that each phase current does not flow.

With the motor driving system shown in FIG. 4, various power-supply voltage abnormalities can be detected by detecting a current on the input side (ac side) of the PWM rectifying circuit 43, and in response to this detection, the PWM inverter 46 and/or the PWM rectifying circuit 43 can be controlled so as to prevent the occurrence of damage to components of the PWM rectifying circuit 43 or abnormal sound.

FIG. 5 is a schematic diagram showing the configuration of a motor driving system into which another embodiment of this invention is incorporated.

In this motor driving system, a matrix converter 63 has its input terminal connected to a three-phase ac power supply 61 via a main relay 62, and the output of the matrix converter 63 is supplied to a motor 67. And, the system includes a current detecting part 68 such as a current transformer for detecting current between the matrix converter 63 and motor 67, an abnormality detecting part 69 for performing abnormality detection by adopting a detected current value as input, thereby outputting an abnormality detection signal, and a matrix converter control part 70 for controlling each switching device of the matrix converter 63 by adopting detected current as input, and further, controlling each switching device of the matrix converter 63 by adopting the abnormality detection signal as input so as to deal with a supply voltage abnormality of the matrix converter 63. The current detecting part 68 may be anything that detects currents for three phases, but may be anything that only detects currents for two phases. In the latter case, the rest of current for one phase can be detected by computation in a required processing part.

Further, in this embodiment, the matrix converter 63 serves both as a rectifying circuit and an inverter.

The abnormality detecting part 69 is to detect a three-phase unbalance by computing a root-mean-square current value of each of three-phase currents to obtain an unbalance factor of each phase current. However, detection of a power-supply open phase may be achieved by detecting the presence of phase in which current does not flow. And, detection of an instantaneous voltage drop may also be achieved by computing a root-mean-square current value. Further, detection of an instantaneous interruption of service may also be achieved based on that each phase current does not flow.

Further, the abnormality detecting part 69 has the function of, setting a first power-supply voltage abnormality detection level for stopping the PWM operation and a second level lower than that, and in the case where the detected current value is not less than the second level and under the first level, outputting the abnormality detection signal indicative of stopping of the switching operation of the matrix converter 63 in that carrier period so as to prevent the occurrence of component damage or abnormal sound.

Since the processing in the matrix converter control part 70 and the processing in the matrix converter 63 during normal operation have conventionally been known (e.g., cf. 2004, The Institute of Electrical Engineers of Japan, National Conference, 4-070 to 073), detailed description will be omitted.

With the motor driving system shown in FIG. 5, various power-supply voltage abnormalities can be detected by detecting a current on the output side of the matrix converter 63, and in response to this detection, the matrix converter 63 can be controlled so as to prevent the occurrence of damage to components of the matrix converter 63 or abnormal sound.

However, in the embodiment shown in FIG. 5, a current on the input side of the matrix converter 63 may be detected, instead of the current on the output side of the matrix converter 63.

Next, detection of three-phase unbalance will be described with reference to waveforms shown in FIGS. 6 and 7. FIG. 6 shows the case where a three-phase unbalance is ±2%, and FIG. 7 shows the case where a three-phase unbalance is 0%. Further, in both the diagrams, (A) indicates respective phase voltages Vr, Vs and Vt; (B) to (D) indicate respective phase currents I (L1), I (L2) and I (L3); (E) indicates synthesized currents of respective phase currents I (L1), I (L2) and I (L3); (F) indicates an output voltage VP of the rectifying circuit; (G) indicates a voltage Vdc between terminals of the capacitor; and (H) indicates a current I (Ld) flowing to the output side of the rectifying circuit.

As understood by comparison between FIGS. 6 and 7, since a current unbalance becomes about ±20% in the case where a three-phase unbalance factor of the power supply voltage is ±2%, it is difficult to detect the power-supply voltage three-phase unbalance from the supply voltage waveforms, but it is easy to detect the power-supply voltage three-phase unbalance from the current waveforms. Further, detection of the power-supply voltage three-phase unbalance from the current waveforms can be improved in accuracy. And, the operation can be maintained while achieving protection of components by limiting the output, with no excess of the current-carrying capacity of each component such as a diode, capacitor or the like, even when a power-supply voltage unbalance occurs.

In the single-phase PWM rectifying circuit shown in FIG. 2, an input current IAC greatly distorts when a voltage distortion occurs, even when it is a voltage distortion as shown in FIG. 8 (a voltage distortion difficult to detect from supply voltage waveforms, cf. a power supply voltage VAC in FIG. 8), which may cause device breakdown. However, detection of a power supply abnormality can be achieved based on the current waveforms. In this case, the operation can be maintained under safe conditions by limiting the output power such that the current peak value does not reach an overcurrent level, even when a voltage distortion occurs.

In the three-phase full-bridge diode rectifying circuit 3 shown in FIG. 1, voltage waveforms and current waveforms of respective components are obtained as shown in FIG. 9 when an open phase occurs, so that the occurrence of power-supply open phase can be detected easily and accurately.

In the above-described embodiment, supply voltage waveforms are not detected, but current detection is performed. Therefore, current detection can be achieved using a low-cost and compact current transformer. That is, an inverter control circuit generally has its ground connected to the minus side of the dc current part of a rectifying circuit, and needs to be insulated in order to detect supply voltage waveforms on the ac side of the rectifying circuit, which requires an expensive and large component such as a transformer to be provided in a supply voltage detecting circuit, however, such expensive and large component can be made unnecessary by detecting current. Further, since current detecting means has conventionally been provided for performing power control (drop, stop or the like at overload), the aforementioned current detection can be performed by using this current detecting means, which can prevent an increase in cost. In the PWM rectifying circuit, the aforementioned current detection can be performed by using input current detecting means used for input current control.

BRIEF DESCRIPTION OF DRAWINGS

FIG. 1 is a schematic diagram showing the configuration of a motor driving system into which an embodiment of this invention is incorporated.

FIG. 2 is a schematic diagram showing the configuration of a motor driving system into which another embodiment of this invention is incorporated.

FIG. 8 is a diagram showing power-supply voltage waveforms and current waveforms at the occurrence of power-supply voltage distortion.

Figure 3:
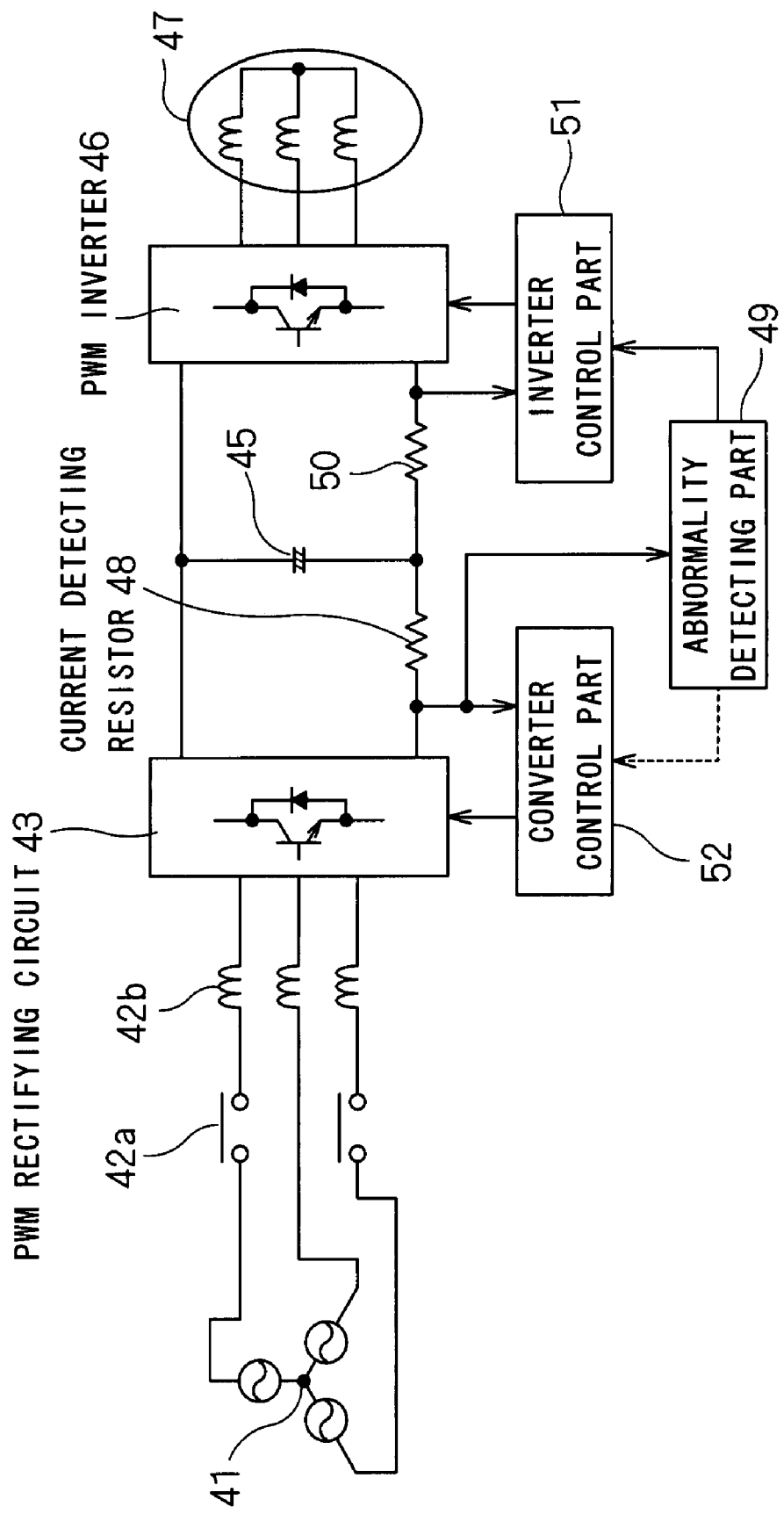
FIG. 3 is a schematic diagram showing the configuration of a motor driving system into which still another embodiment of this invention is incorporated.
Figure 4:
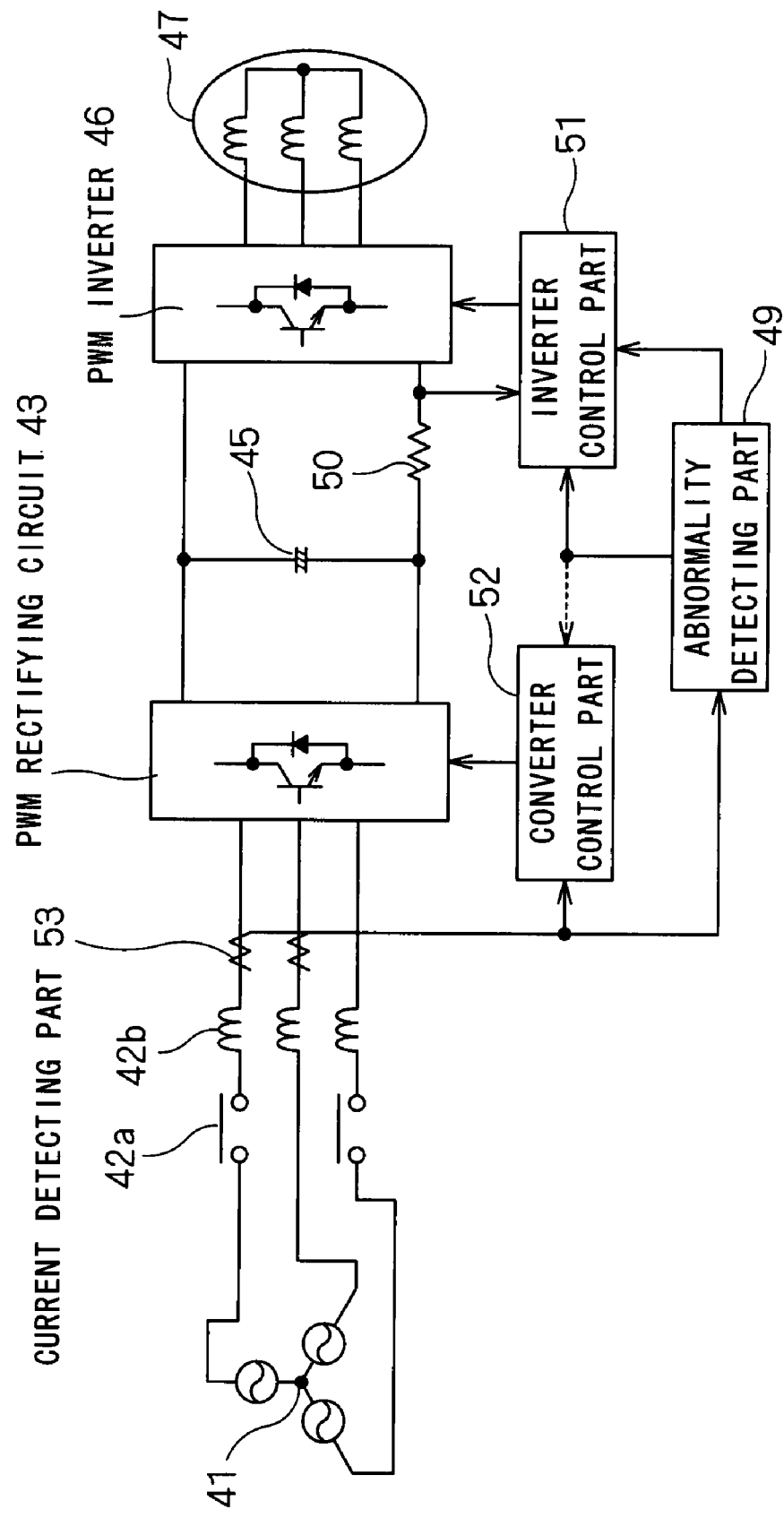
FIG. 4 is a schematic diagram showing the configuration of a motor driving system into which still another embodiment of this invention is incorporated.
Figure 5:
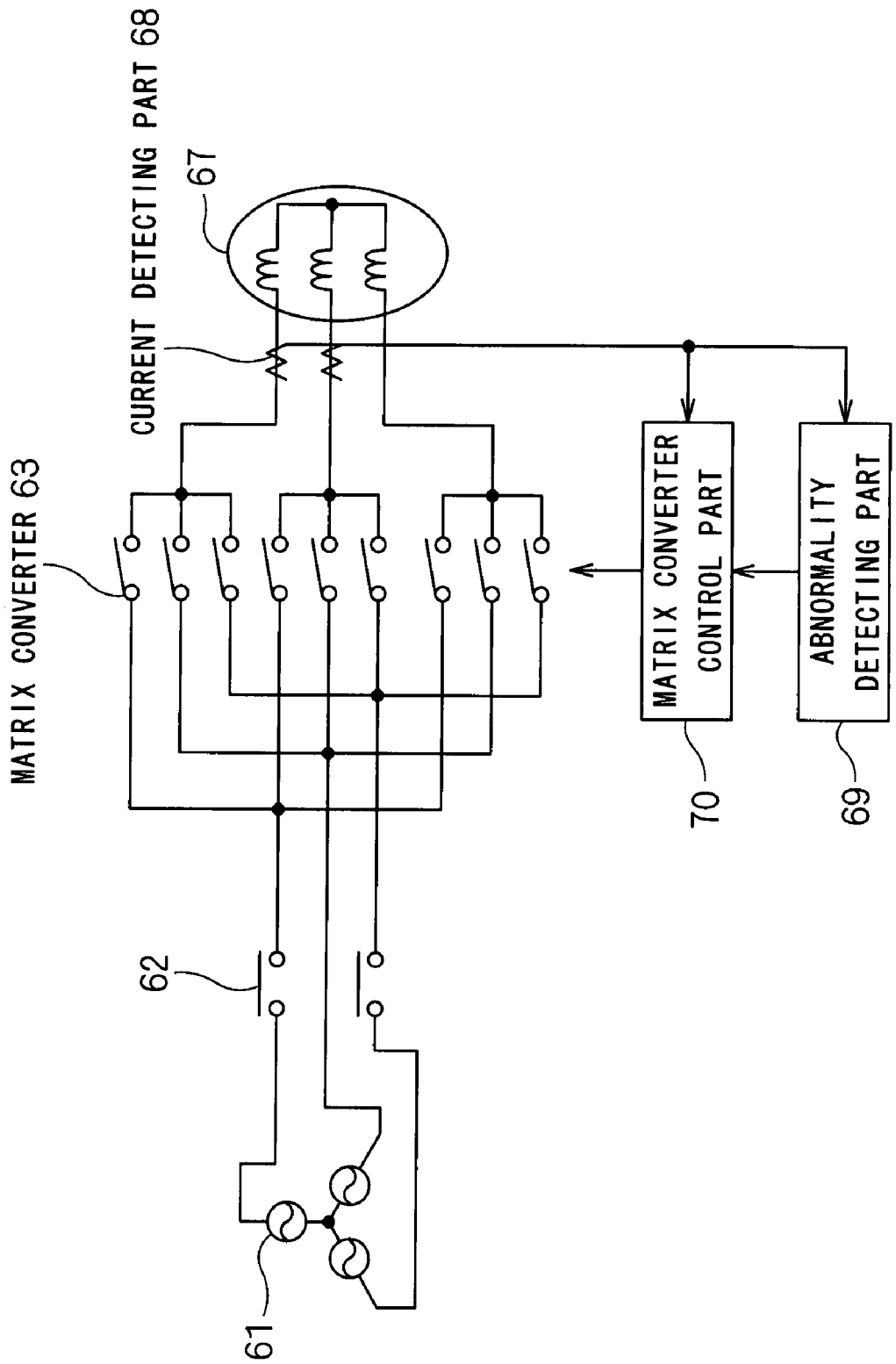
FIG. 5 is a schematic diagram showing the configuration of a motor driving system into which still another embodiment of this invention is incorporated.
Figure 6:
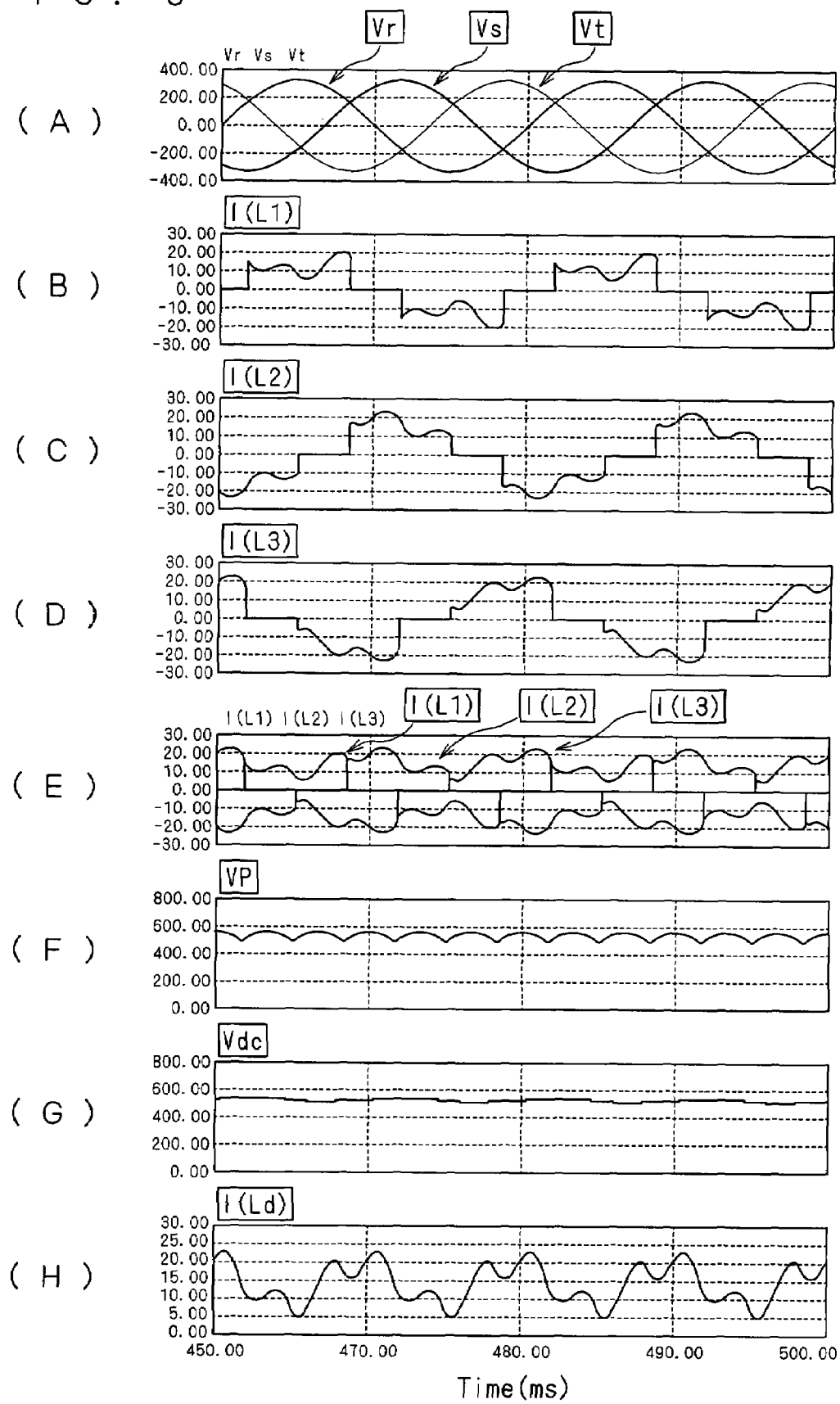
FIG. 6 is a diagram showing voltage waveforms and current waveforms of respective components in the case where a three-phase unbalance is ±2%.
Figure 7:
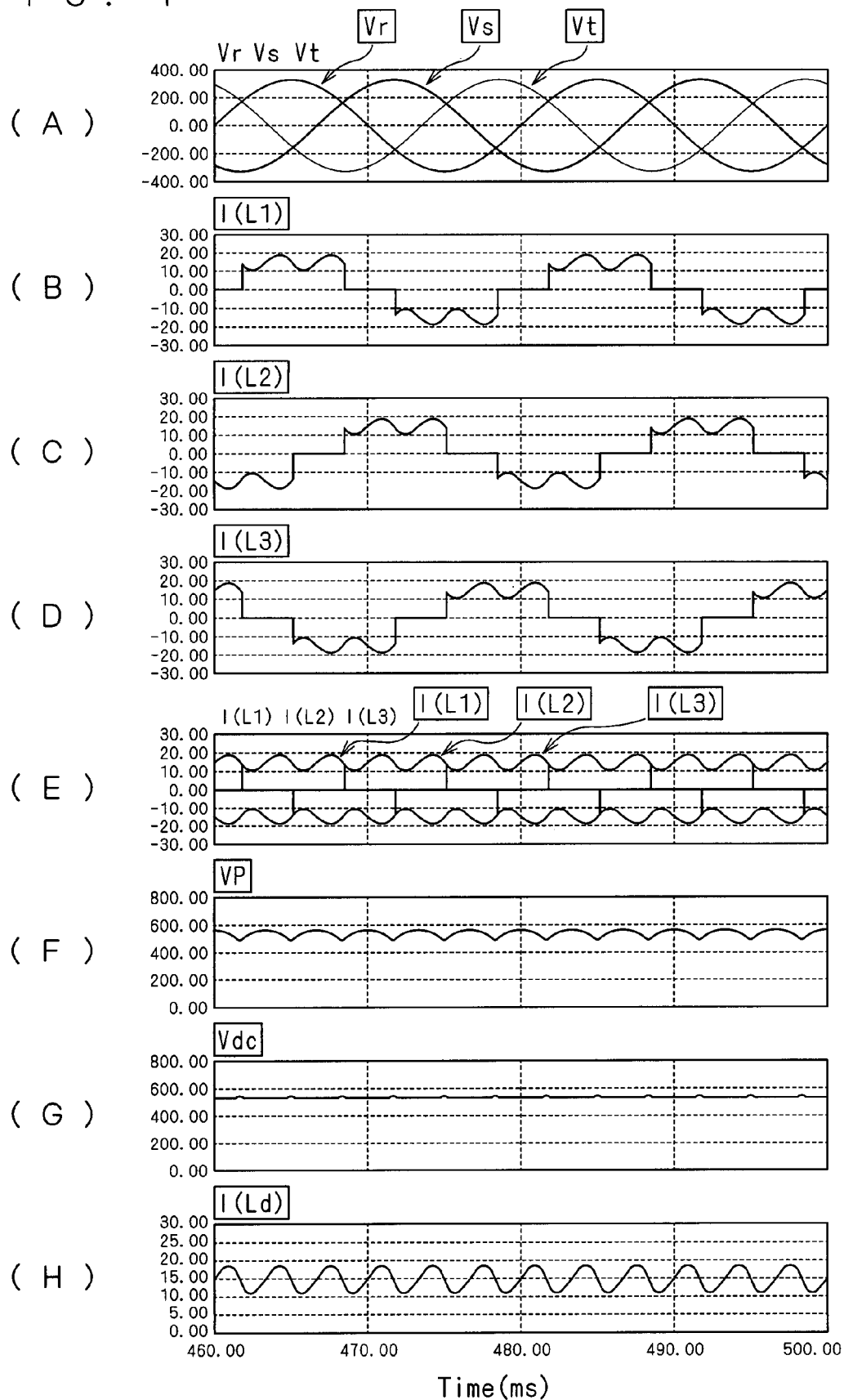
FIG. 7 is a diagram showing voltage waveforms and current waveforms of respective components in the case where a three-phase unbalance is 0%.
Figure 9:
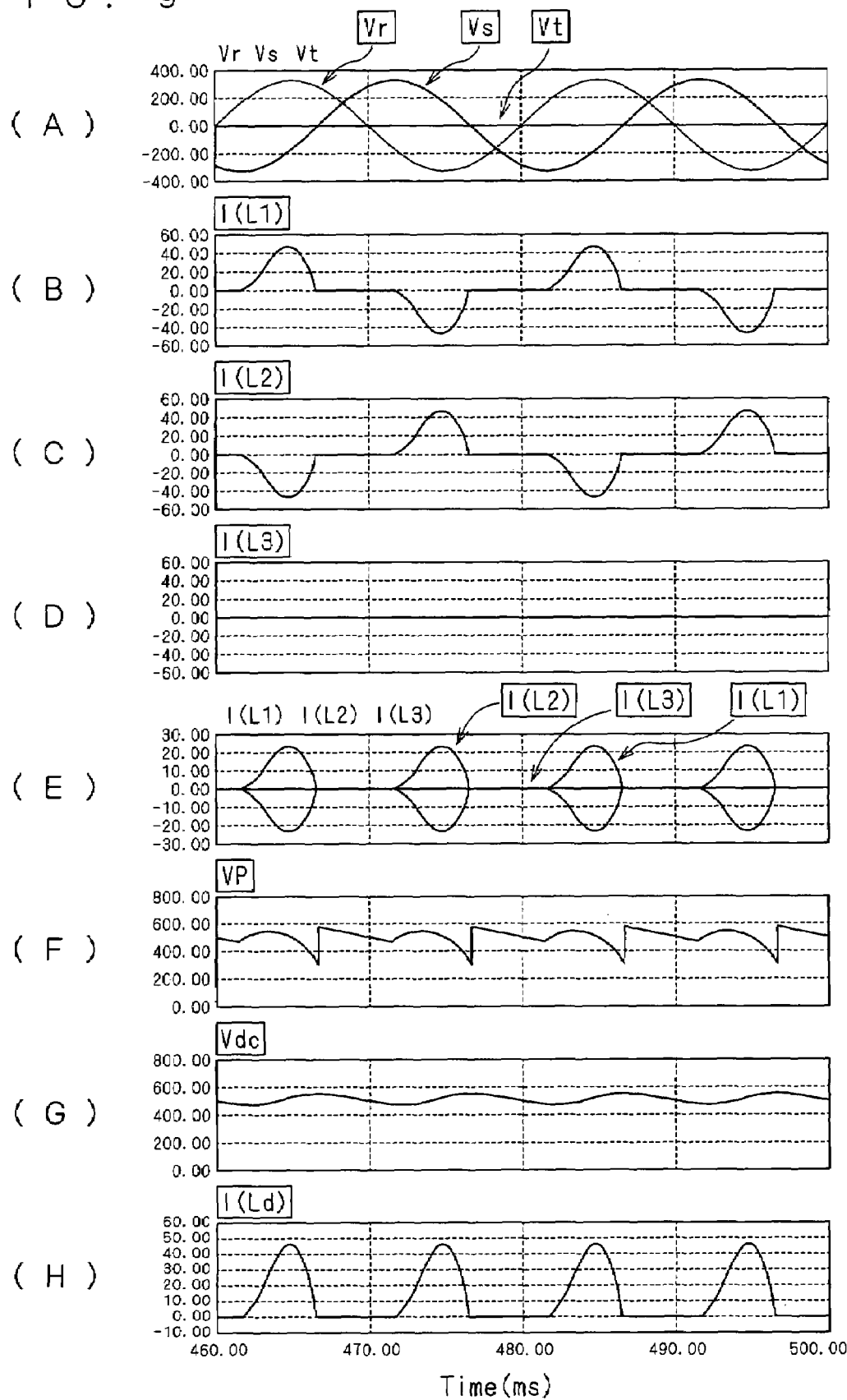
FIG. 9 is a diagram showing voltage waveforms and current waveforms of respective components at the occurrence of power-supply open phase.

EXPLANATION OF REFERENCE NUMERALS 3 three-phase full-bridge diode rectifying circuit
6 PWM inverter
8 current detecting part
9 abnormality detecting part
23 single-phase full-bridge diode rectifying circuit
26 PWM inverter
28 current detecting resistor
29 abnormality detecting part
43 PWM rectifying circuit
46 PWM inverter
48 current detecting resistor
49 abnormality detecting part
53 current detecting part
63 matrix converter
68 current detecting part
69 abnormality detecting part

The invention claimed is:

1. A power supply circuit protecting method in an apparatus including a power supply circuit for converting an ac input voltage into a prescribed output voltage and an output operation circuit for performing a prescribed operation by adopting the output voltage as input, said power supply circuit protecting method comprising:
   detecting a current value of the power supply circuit;
   judging presence or absence of abnormality at a first level in a supply voltage to the power supply circuit based on the detected current value, the abnormality at the first level requiring the output operation circuit to be stopped;
   judging presence or absence of abnormality at a second level, lower than the first level, in the supply voltage to the power supply circuit based on the detected current value;
   stopping the output operation circuit in response to a judgment that the abnormality at the first level in the supply voltage is present; and
   changing operating conditions of the output operation circuit in response to a judgment that the abnormality at the second level in the supply voltage is present.

2. The power supply circuit protecting method according to claim 1, wherein the changing the operating conditions includes:
   reducing output frequency and duty of the output operation circuit.

3. The power supply circuit protecting method according to claim 1, further comprising:
   judging whether the abnormality at the second level is present for a predetermined period of time; and
   stopping the output operation circuit in response to a judgment that the abnormality at the second level is present for the predetermined time even when the abnormality at the first level is not present.

4. A power supply circuit protecting apparatus, comprising:
   a power supply circuit for converting an ac input voltage into a prescribed output voltage;
   an output operation circuit for performing a prescribed operation by adopting the output voltage as input;
   a current detector configured to detect a current value of the power supply circuit;
   a judging unit configured to judge presence or absence of abnormality at a first level that requires the output operation circuit to be stopped and the presence or absence of a supply voltage abnormality at a second level lower than the first level in a supply voltage to the power supply circuit based on a detected current value;
   a controller configured to stop the output operation circuit in response to a judgment that the abnormality at the first level of the supply voltage abnormality is present, and configured to change operating conditions of the output operation circuit in response to a judgment that the abnormality at the second level of the supply voltage is present.

5. The power supply circuit protecting apparatus according to claim 4, wherein
   said current detector detects the current value on an input side of the power supply circuit.

6. The power supply circuit protecting apparatus according to claim 4, wherein
   said current detector detects the current value on an output side of the power supply circuit.

7. The power supply circuit protecting apparatus according to claim 4, wherein
   said judging unit judges the presence or absence of a power supply unbalance as the presence or absence of the supply voltage abnormality.

8. The power supply circuit protecting apparatus according to claim 4, wherein
   said judging unit judges the presence or absence of a supply voltage distortion as the presence or absence of the supply voltage abnormality.

9. The power supply circuit protecting apparatus according to claim 4, wherein
   said judging unit judges the presence or absence of a power-supply open phase as the presence or absence of the supply voltage abnormality.

10. The power supply circuit protecting apparatus according to claim 4, wherein
    said judging unit judges the presence or absence of an instantaneous voltage drop as the presence or absence of the supply voltage abnormality.

11. The power supply circuit protecting apparatus according to claim 4, wherein
    said judging unit judges the presence or absence of an instantaneous interruption of service as the presence or absence of the supply voltage abnormality.

12. The power supply circuit protecting apparatus according to claim 4, wherein
    said controller stops the output operation circuit in response to a judgment made by the judging unit that the supply voltage abnormality is present.

13. The power supply circuit protecting apparatus according to claim 4, wherein
    said controller stops the power supply circuit in response to a judgment made by the judging unit that the supply voltage abnormality is present.

14. The power supply circuit protecting apparatus according to claim 4, wherein
    the changing the operating conditions of the output operation circuit includes a reduction of output frequency and duty of the output operation circuit.

15. The power supply circuit protecting apparatus according to claim 4, wherein the judging unit is configured to judge whether the abnormality at the second level is present for a predetermined period of time, and the controller is configured to stop the output operation circuit in response to a judgment that the abnormality at the second level is present for the predetermined time even when the abnormality at the first level is not present.

16. A power supply circuit protecting method in an apparatus including a power supply circuit for converting an ac input voltage into a prescribed output voltage and an output operation circuit for performing a prescribed operation by adopting the output voltage as input, said power supply circuit protecting method comprising:

detecting a current value of the power supply circuit;

judging presence or absence of abnormality at a first level in a supply voltage to the power supply circuit based on the detected current value, the abnormality at the first level requiring the output operation circuit to be stopped;

judging presence or absence of abnormality at a second level, lower than the first level, in the supply voltage to the power supply circuit based on the detected current value;

stopping the power supply circuit in response to a judgment that the abnormality at the first level in the supply voltage is present; and changing operating conditions of the output operation circuit in response to a judgment that the abnormality at the second level in the supply voltage is present.

17. The power supply circuit protecting method according to claim 16, wherein the changing the operating conditions includes:

reducing output frequency and duty of the output operation circuit.

18. The power supply circuit protecting method according to claim 16, further comprising:

judging whether the abnormality at the second level is present for a predetermined period of time; and stopping the power supply circuit in response to a judgment that the abnormality at the second level is present for the predetermined time even when the abnormality at the first level is not present.

19. A power supply circuit protecting apparatus, comprising:

a power supply circuit for converting an ac input voltage into a prescribed output voltage;

an output operation circuit for performing a prescribed operation by adopting the output voltage as input;

a current detector configured to detect a current value of the power supply circuit;

a judging unit configured to judge presence or absence of abnormality at a first level that requires the output operation circuit to be stopped and the presence or absence of a supply voltage abnormality at a second level lower than the first level in a supply voltage to the power supply circuit based on a detected current value;

a controller configured to stop the power supply circuit in response to a judgment that the abnormality at the first level of the supply voltage abnormality is present, and configured to change operating conditions of the output operation circuit in response to a judgment that the abnormality at the second level of the supply voltage is present.

20. The power supply circuit protecting apparatus according to claim 19, wherein the changing the operating conditions of the output operation circuit includes a reduction of output frequency and duty of the output operation circuit.

21. The power supply circuit protecting apparatus according to claim 19, wherein the judging unit is configured to judge whether the abnormality at the second level is present for a predetermined period of time, and the controller is configured to stop the power supply circuit in response to a judgment that the abnormality at the second level is present for the predetermined time even when the abnormality at the first level is not present.

22. The power supply circuit protecting apparatus according to claim 19, wherein said current detector detects the current value on an input side of the power supply circuit.

23. The power supply circuit protecting apparatus according to claim 19, wherein said current detector detects the current value on an output side of the power supply circuit.

24. The power supply circuit protecting apparatus according to claim 19, wherein said judging unit judges the presence or absence of a power supply unbalance as the presence or absence of the supply voltage abnormality.

25. The power supply circuit protecting apparatus according to claim 19, wherein said judging unit judges the presence or absence of a supply voltage distortion as the presence or absence of the supply voltage abnormality.

26. The power supply circuit protecting apparatus according to claim 19, wherein said judging unit judges the presence or absence of a power-supply open phase as the presence or absence of the supply voltage abnormality.

27. The power supply circuit protecting apparatus according to claim 19, wherein said judging unit judges the presence or absence of an instantaneous voltage drop as the presence or absence of the supply voltage abnormality.

28. The power supply circuit protecting apparatus according to claim 19, wherein said judging unit judges the presence or absence of an instantaneous interruption of service as the presence or absence of the supply voltage abnormality.

29. The power supply circuit protecting apparatus according to claim 19, wherein said controller stops the output operation circuit in response to a judgment made by the judging unit that the supply voltage abnormality is present.

30. The power supply circuit protecting apparatus according to claim 19, wherein said controller stops the power supply circuit in response to a judgment made by the judging unit that the supply voltage abnormality is present.

* * * * *